(12) United States Patent  
Iguchi et al.

(10) Patent No.: US 11,501,919 B2  
(45) Date of Patent: Nov. 15, 2022

(54) DIELECTRIC COMPOSITION AND ELECTRONIC DEVICE

(71) Applicant: TDK CORPORATION, Tokyo (JP)

(72) Inventors: Toshihiro Iguchi, Tokyo (JP); Nobuto Morigasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 200 days.

(21) Appl. No.: 17/119,212

(22) Filed: Dec. 11, 2020

(65) Prior Publication Data

US 2021/0202169 A1    Jul. 1, 2021

(30) Foreign Application Priority Data

Dec. 27, 2019  (JP) .............................. JP2019-238933

(51) Int. Cl.
| | |
|---|---|
| *H01G 4/12* | (2006.01) |
| *C04B 35/465* | (2006.01) |
| *C04B 35/468* | (2006.01) |
| *C04B 35/48* | (2006.01) |
| *C04B 35/50* | (2006.01) |

(52) U.S. Cl.
CPC .......... *H01G 4/1227* (2013.01); *C04B 35/465* (2013.01); *C04B 35/481* (2013.01); *C04B 35/50* (2013.01); *H01G 4/1245* (2013.01)

(58) Field of Classification Search
CPC ... C04B 35/465; C04B 35/4682; C04B 35/49; H01G 4/1227; H01G 4/1236; H01G 4/1245
See application file for complete search history.

(56) References Cited

U.S. PATENT DOCUMENTS

| | | | |
|---|---|---|---|
| 11,367,571 B2 * | 6/2022 | Iguchi | .................. C04B 35/465 |
| 2015/0036262 A1 * | 2/2015 | Kai | ..................... H01G 4/1209 |
| | | | 361/301.4 |
| 2018/0061572 A1 * | 3/2018 | Kano | ..................... C04B 35/64 |
| 2021/0179494 A1 * | 6/2021 | Iguchi | .................... C04B 35/03 |
| 2021/0183573 A1 * | 6/2021 | Iguchi | ................. H01G 4/1227 |
| 2022/0254569 A1 * | 8/2022 | Ariizumi | ............. H01G 4/1209 |

FOREIGN PATENT DOCUMENTS

JP     2002-293617 A    10/2002

* cited by examiner

*Primary Examiner* — Karl E Group  
(74) *Attorney, Agent, or Firm* — Oliff PLC

(57) ABSTRACT

A dielectric composition includes main phases and Ca-RE-Si—O segregation phases. The main phases include a main component expressed by $ABO_3$. "A" includes at least one selected from barium and calcium. "B" includes at least one selected from titanium and zirconium. "RE" represents at least one of rare earth elements. A molar ratio of (Si/Ca) is larger than one. A molar ratio of (Si/RE) is larger than one, provided that the molar ratio of (Si/RE) is a molar ratio of silicon included in the segregation phases to the rare earth elements included therein. An average length of major axes of the segregation phases is 1.30-2.80 times as large as an average particle size of the main phases. An average length of minor axes of the segregation phases is 0.21-0.48 times as large as an average particle size of the main phases.

18 Claims, 3 Drawing Sheets

DIELECTRIC COMPOSITION AND ELECTRONIC DEVICE

BACKGROUND OF THE INVENTION

The present invention relates to a dielectric composition and an electronic device including dielectric layers composed of the dielectric composition.

An electronic circuit or a power supply circuit incorporated into electronic equipment is provided with a large number of electronic components such as multilayer ceramic capacitors that utilize dielectric characteristics expressed by dielectric material. Patent Document 1 discloses a dielectric ceramic in which a coverage layer composed of a complex oxide containing alkaline-earth elements, rare earth elements, and Si is formed on the surfaces of the main crystal particles.

However, it has been found that the above-mentioned dielectric ceramic does not have a sufficiently high density or a sufficient strength.

Patent Document 1: JP2002293617 (A)

BRIEF SUMMARY OF INVENTION

The present invention has been achieved under such circumstances. It is an object of the invention to provide a dielectric composition having a high density and a high strength and an electronic device including a dielectric layer composed of the dielectric composition.

To achieve the above object, a dielectric composition according to the present invention includes main phases and Ca-RE-Si—O segregation phases, wherein the main phases include a main component expressed by $ABO_3$, "A" includes at least one selected from barium and calcium, "B" includes at least one selected from titanium and zirconium, "RE" represents at least one of rare earth elements, a molar ratio of (Si/Ca) is larger than one, provided that the molar ratio of (Si/Ca) is a molar ratio of silicon included in the Ca-RE-Si—O segregation phases to calcium included in the Ca-RE-Si—O segregation phases, a molar ratio of (Si/RE) is larger than one, provided that the molar ratio of (Si/RE) is a molar ratio of silicon included in the Ca-RE-Si—O segregation phases to the rare earth elements included in the Ca-RE-Si—O segregation phases, an average length of major axes of the Ca-RE-Si—O segregation phases is 1.30-2.80 times as large as an average particle size of the main phases, and an average length of minor axes of the Ca-RE-Si—O segregation phases is 0.21-0.48 times as large as an average particle size of the main phases.

In the dielectric composition according to the present invention, it is preferred that a molar ratio of (RE/Ca) is larger than one, provided that the molar ratio of (RE/Ca) is a molar ratio of the rare earth elements included in the Ca-RE-Si—O segregation phases to calcium included in the Ca-RE-Si—O segregation phases.

In the dielectric composition according to the present invention, it is preferred that "RE" is at least one selected from yttrium, dysprosium, and holmium.

In the dielectric composition according to the present invention, it is preferred that a total of calcium, the rare earth elements, and silicon included in the Ca-RE-Si—O segregation phases is 0.9 parts by mol or more, provided that a total of elements excluding oxygen included in the Ca-RE-Si—O segregation phases is 1 part by mol.

In the dielectric composition according to the present invention, it is preferred that the Ca-RE-Si—O segregation phases have a hexagonal crystal system.

In the dielectric composition according to the present invention, it is preferred that a space group of the Ca-RE-Si—O segregation phase is as follows:

$P6_3/m$

In the dielectric composition according to the present invention, it is preferred that an electronic component includes the dielectric composition according to the present invention.

DETAILED DESCRIPTION OF INVENTION

<1. Multilayer Ceramic Capacitor>

Figure 1A:
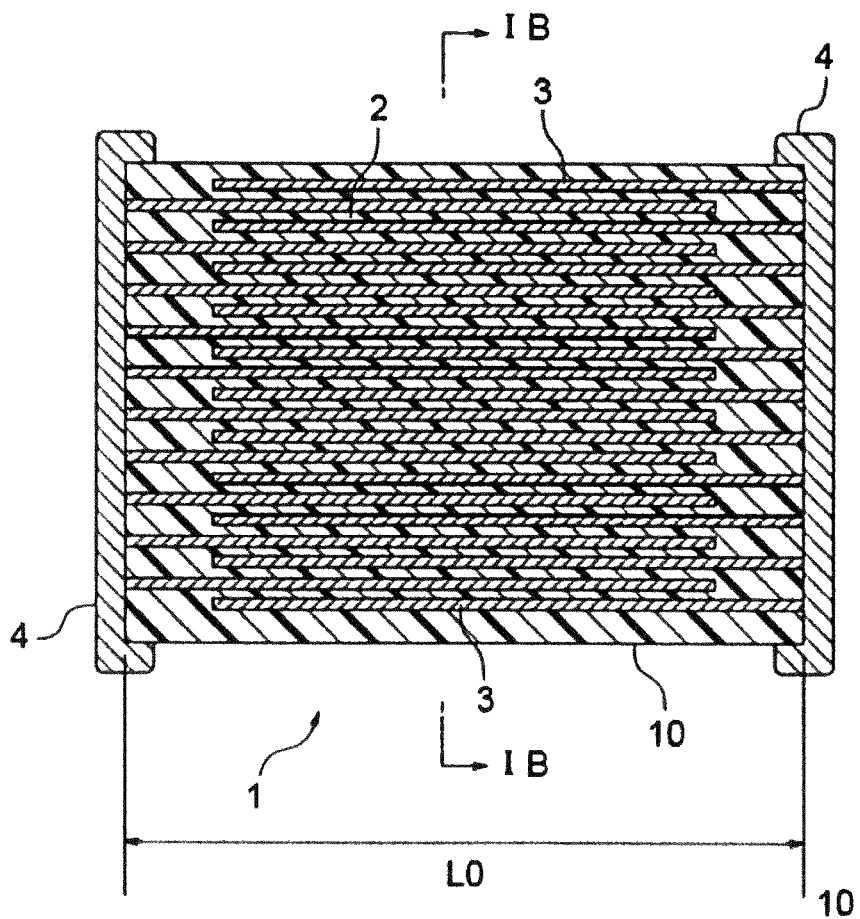
FIG. 1A is a cross-sectional view of a multilayer ceramic capacitor according to an embodiment of the present invention.
Figure 1B:
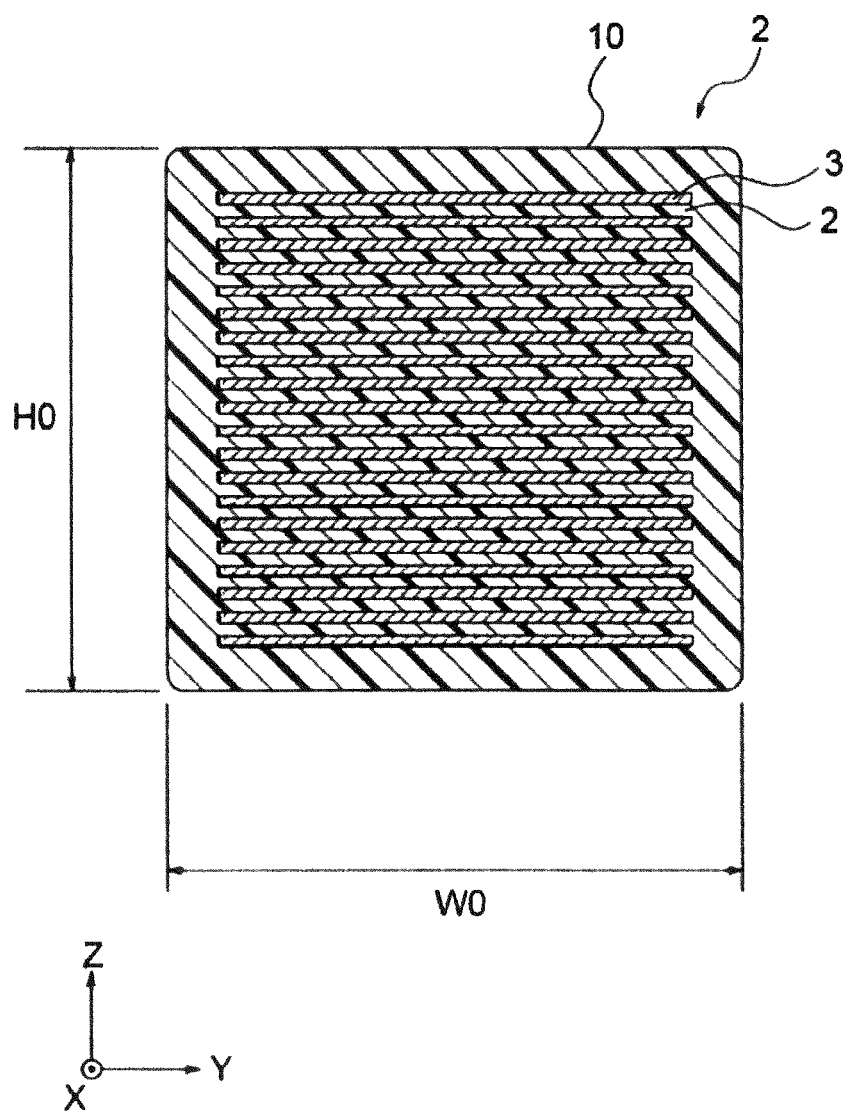
FIG. 1B is a cross-sectional view of the multilayer ceramic capacitor along the IB-IB line of FIG. 1A.

FIG. 1A and FIG. 1B show a multilayer ceramic capacitor 1 as an electronic component according to the present embodiment. The multilayer ceramic capacitor 1 includes an element body 10 formed by alternately laminating dielectric layers 2 and internal electrode layers 3. A pair of external electrodes 4 is formed on both ends of the element body 10 and is conducted with the internal electrode layers 3 alternately arranged inside the element body 10. The element body 10 may have any shape, but normally has a rectangular parallelepiped shape. The size of the element body 10 is not limited and is appropriately determined based on usage.

1.1 Dielectric Layers

The dielectric layers 2 are composed of a dielectric composition according to the present embodiment mentioned below.

The thickness of the dielectric layers 2 per one layer (thickness between layers) is not limited and can be determined freely based on desired characteristics, usage, etc. The thickness between layers of the dielectric layers 2 is normally preferably 30 μm or less, more preferably 20 μm or less, and still more preferably 10 μm or less. The lamination number of dielectric layers 2 is not limited, but is preferably, for example, 20 or more in the present embodiment.

1.2 Internal Electrode Layers

In the present embodiment, the internal electrode layers 3 are laminated so that their ends are alternately exposed to the surfaces of two end surface of the element body 10 facing each other.

The internal electrode layers 3 contain any conductive material. The noble metal of the conductive material is Pd, Pt, Ag—Pd alloy, etc. The base metal of the conductive material is Ni, Ni based alloy, Cu, Cu based alloy, etc. Incidentally, about 0.1 mass % or less of various fine components, such as P and/or S, may be contained in Ni, Ni based alloy, Cu, or Cu based alloy. The internal electrode layers 3 may be formed using a commercially available electrode paste. The thickness of the internal electrode layers 3 is determined appropriately based on usage or so.

1.3 External Electrodes

The external electrodes 4 contain any conductive material. For example, the external electrodes 4 contain a known conductive material of Ni, Cu, Sn, Ag, Pd, Pt, Au, their alloy, conductive resin, or the like. The thickness of the external electrodes 4 is determined appropriately based on usage or so.

<2. Dielectric Composition>

Figure 2:
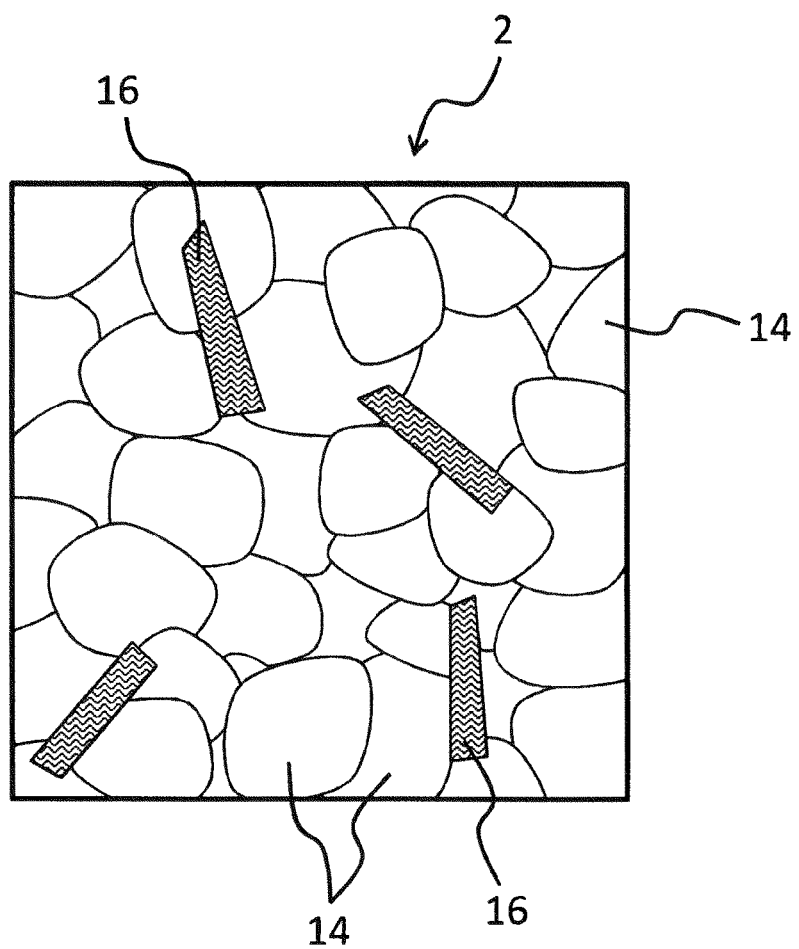
FIG. 2 is a schematic view of a cross section of a dielectric composition constituting dielectric layers shown in FIG. 1A.

As shown in FIG. 2, the dielectric composition constituting the dielectric layers 2 according to the present embodiment includes Ca-RE-Si—O segregation phases 16 among main phases 14. "RE" represents at least one of rare earth elements.

The kind of the rare earth elements (RE) is not limited, but the rare earth elements (RE) are preferably at least one selected from yttrium (Y), dysprosium (Dy), and holmium (Ho) and are more preferably dysprosium (Dy). This makes it easy to mutually disperse components of the main phases 14 via the Ca-RE-Si—O segregation phases 16 at the time of firing and makes it possible to further enhance the density. The rare earth elements (RE) may be used alone or in combination of two or more kinds.

2.1 Main Phases

The main phases 14 according to the present embodiment include a main component expressed by $ABO_3$. The main component is a component occupying 80-100 parts by mass to 100 parts by mass of the main phases and is preferably a component occupying 90-100 parts by mass to 100 parts by mass of the main phases.

The molar ratio of "A" to "B" expressed by (a molar ratio of "A"/a molar ratio of "B") may be one or may not be one. Preferably, the molar ratio of "A" to "B" is 0.9-1.2.

"A" includes at least one selected from barium (Ba) and calcium (Ca). In the present embodiment, "A" is preferably barium (Ba).

When "A" is barium (Ba) and calcium (Ca), the amount of barium (Ba) is preferably 0.9-1 parts by mol, provided that a total of barium (Ba) and calcium (Ca) is 1 part by mol.

"B" includes at least one selected from titanium (Ti) and zirconium (Zr). In the present embodiment, "B" is preferably titanium (Ti).

When "B" is titanium (Ti) and zirconium (Zr), the amount of titanium (Ti) is preferably 0.8-1 parts by mol, provided that a total of titanium (Ti) and zirconium (Zr) is 1 part by mol.

In the present embodiment, the main phases 14 may include elements of magnesium (Mg), manganese (Mn), chromium (Cr), aluminum (Al), silicon (Si), vanadium (V), rare earth element (RE), etc.

In the present embodiment, the main phases may have any average particle size, but preferably have an average particle size of 0.05-5 μm and more preferably have an average particle size of 0.1-1 μm.

2.2 Ca-RE-Si—O Segregation Phases

As shown in FIG. 2, the dielectric composition constituting the dielectric layers 2 according to the present embodiment includes Ca-RE-Si—O segregation phases 16 among the above-mentioned main phases 14. This allows the dielectric composition according to the present embodiment to have a high density and a high strength.

When a molar ratio of silicon (Si) included in the Ca-RE-Si—O segregation phases 16 to calcium (Ca) included in the Ca-RE-Si—O segregation phases 16 is expressed by a molar ratio of (Si/Ca), the molar ratio of (Si/Ca) is larger than one and is preferably 1.72 or more and 4.00 or less.

When a molar ratio of silicon (Si) included in the Ca-RE-Si—O segregation phases 16 to rare earth elements (RE) included in the Ca-RE-Si—O segregation phases 16 is expressed by a molar ratio of (Si/RE), the molar ratio of (Si/RE) is larger than one and is preferably 1.06 or more and 3.00 or less.

When a molar ratio of rare earth elements (RE) included in the Ca-RE-Si—O segregation phases 16 to calcium (Ca) included in the Ca-RE-Si—O segregation phases 16 is expressed by a molar ratio of (RE/Ca), the molar ratio of (RE/Ca) is larger than one and is preferably 1.33 or more and 2.39 or less.

That is, preferably, the amounts of calcium (Ca), rare earth elements (RE), and silicon (Si) of the Ca-RE-Si—O segregation phases 16 satisfy a relation of silicon (Si)>rare earth elements (RE)>calcium (Ca) in terms of mole ratio in the present embodiment.

When a total of elements other than oxygen included in the Ca-RE-Si—O segregation phases 16 is 1 part by mol, a total of calcium (Ca), rare earth elements (RE), and silicon (Si) included in the Ca-RE-Si—O segregation phases 16 is preferably 0.9 parts by mol or more and is more preferably 0.95 parts by mol. This makes it hard to restrain the dispersion of components of the main phases 14 via the Ca-RE-Si—O segregation phases 16 at the time of firing and thereby makes it possible to further enhance the density.

Incidentally, the Ca-RE-Si—O segregation phases 16 may include elements other than calcium (Ca), rare earth elements (RE), silicon (Si), and oxygen (O) and may include, for example, titanium (Ti), barium (Ba), manganese (Mn), vanadium (V), zirconium (Zr), and magnesium (Mg).

In the present embodiment, an average length of major axes of the Ca-RE-Si—O segregation phases 16 is 1.30-2.80 times (preferably, 1.59-2.09 times) as large as an average particle size of the main phases 14. This allows the dielectric composition according to the present embodiment to have a higher density and a higher strength.

In the present embodiment, an average length of minor axes of the Ca-RE-Si—O segregation phases 16 is 0.21-0.48 times (preferably, 0.29-0.44 times) as large as an average particle size of the main phases 14. This allows the dielectric composition according to the present embodiment to have a higher density and a higher strength.

In the present embodiment, preferably, the Ca-RE-Si—O segregation phases 16 have a hexagonal crystal system. This makes it easier to dissolve components of the main phases 14 in solid into the Ca-RE-Si—O segregation phases 16 and to mutually disperse the components of the main phases 14 via the Ca-RE-Si—O segregation phases 16 at the time of firing and makes it possible to further enhance the density.

In the present embodiment, preferably, a space group of the Ca-RE-Si—O segregation phase is $P6_3/m$. This makes it easier to dissolve components of the main phases 14 in solid into the Ca-RE-Si—O segregation phases 16 and to mutually disperse the components of the main phases 14 via the Ca-RE-Si—O segregation phases 16 at the time of firing and makes it possible to further enhance the density.

In the present embodiment, whether or not the dielectric composition constituting the dielectric layers 2 includes the Ca-RE-Si—O segregation phases 16 is determined by any method and is determined by, for example, a specific method as below.

First of all, a cross section of the dielectric composition is photographed using scanning transmission electron microscope (STEM) to obtain a bright field (BF) image. The area of the filed to be photographed is not limited, but is about 1-10 μm square. In this bright field, a region whose contrast is different from that of the main phases 14 is determined to be a secondary phase (i.e., a segregation phase). Whether or not there is a different contrast (i.e., whether or not there is a segregation phase) may be determined visually, with image processing software, or the like.

As for the above-mentioned segregation phases, each amount of calcium (Ca), rare earth elements (RE), and silicon (Si) is measured by EDS analysis.

When calcium (Ca), rare earth elements (RE), and silicon (Si) exist at the same location in the segregation phases; the molar ratio of (Si/Ca) is larger than one; the molar ratio of (Si/RE) is larger than one; an average length of major axes of the segregation phases is 1.30-2.80 times as large as an average particle size of the main phases 14; and an average length of minor axes of the segregation phases is 0.21-0.48 times as large as an average particle size of the main phases 14, these segregation phases are determined to be the Ca-RE-Si—O segregation phases 16.

In addition, the existence of the Ca-RE-Si—O segregation phases 16 may be determined by mapping images. Specifically, a mapping image of calcium (Ca), a mapping image of rare earth elements (RE), and a mapping image of silicon (Si) are compared to each other, and a region where calcium (Ca), rare earth elements (RE), and silicon (Si) exist at the same location is determined. In the determined region, when the molar ratio of (Si/Ca) is larger than one; the molar ratio of (Si/RE) is larger than one; an average length of major axes of the region is 1.30-2.80 times as large as an average particle size of the main phases 14; and an average length of minor axes of the region is 0.21-0.48 times as large as an average particle size of the main phases 14, this determined region is determined to be the Ca-RE-Si—O segregation phase 16.

The dielectric composition according to the present embodiment can have a high density and a high strength.

The multilayer ceramic capacitor 1 mounted on a circuit board may be applied with a stress by deformation (e.g., bending) of the circuit board. Thus, dielectric compositions are required to have a high mechanical strength.

The multilayer ceramic capacitor 1 according to the present embodiment includes the dielectric layers 2 containing the above-mentioned dielectric composition and can thereby exhibit a high strength.

In the present embodiment, preferably, the element body 10 has a length L0 of 3.5-0.4 mm (see FIG. 1A). In the present embodiment, preferably, the element body 10 has a width W0 of 2.7-0.2 mm (see FIG. 1B). In the present embodiment, preferably, the element body 10 has a height H0 of 2.7-0.2 mm (see FIG. 1B). When the element body 10 has a small size, the multilayer ceramic capacitor 1 is less likely to mechanically get broken at the time of deformation of a board on which the multilayer ceramic capacitor 1 is mounted. That is, the element body 10 structured by the dielectric composition according to the present embodiment tends to further improve the mechanical strength by having a small size.

As a specific size of the element body 10, L0×W0 is (3.2±0.3) mm×(2.5±0.2) mm, (3.2±0.3) mm×(1.6±0.2) mm, (2.0±0.2) mm×(1.2±0.1) mm, (1.6±0.2) mm×(0.8±0.1) mm, (1.0±0.1) mm×(0.5±0.05) mm, (0.6±0.06) mm×(0.3±0.03) mm, (0.4±0.04) mm×(0.2±0.02) mm, or the like. The height H0 is not limited and is, for example, equal to or smaller than the width W0

<3. Method of Manufacturing Multilayer Ceramic Capacitor>

Next, a method of manufacturing the multilayer ceramic capacitor 1 shown in FIG. 1 is explained below.

In the present embodiment, prepared are a calcined powder of $ABO_3$ particles (a main component of the main phases 14 constituting the above-mentioned dielectric composition) and a calcined powder of a first additive agent.

The calcined powder of the first additive agent is a calcined powder of calcium (Ca), rare earth elements (RE), and silicon (Si) constituting the Ca-RE-Si—O segregation phases 16 after firing.

Raw materials of the above-mentioned elements are not limited, and oxides of the above-mentioned elements can be used. It is also possible to use various compounds that can obtain oxides of the above-mentioned elements by firing. The various compounds of the elements are carbonates, oxalates, nitrates, hydroxides, organometallic compounds, etc. In the present embodiment, the above-mentioned starting raw materials are preferably powder.

Among the prepared starting raw materials, the raw material of the $ABO_3$ particles is weighed to a predetermined ratio and is thereafter mixed in wet manner for a predetermined time using a ball mill or so. The mixed powder is dried and thereafter heated at 700-1300° C. in the air to obtain a calcined powder of the $ABO_3$ particles. The calcined powder may be pulverized for a predetermined time using a ball mill or so.

Various compounds or so, such as oxides of calcium (Ca), rare earth elements (RE), and silicon (Si) constituting the Ca-RE-Si—O segregation phases 16 after firing, are prepared and heated to obtain the calcined powder of the first additive agent.

Next, the calcined powder of the first additive agent is pulverized. In the present embodiment, the lengths of major axes and minor axes of the Ca-RE-Si—O segregation phases 16 can be changed by changing pulverization conditions (e.g., the pulverization time in a ball mill) of the calcined powder of the first additive agent.

Incidentally, the lengths of major axes and minor axes of the Ca-RE-Si—O segregation phases 16 is changed in any manner and can be changed, for example, by changing the starting raw materials of the first additive agent, the heating temperature of the first additive agent, or the like.

Then, a paste for manufacturing green chips is prepared. The calcined powder of the $ABO_3$ particles, the calcined powder of the first additive agent, a binder, and a solvent are kneaded and turned into a paint to obtain a paste for dielectric layers. The binder and the solvent are known ones.

If necessary, the paste for dielectric layers may include additives, such as plasticizers and dispersants.

A paste for internal electrode layers is obtained by kneading the above-mentioned raw material of the conductive material, a binder, and a solvent. The binder and the solvent are known ones. If necessary, the paste for internal electrode layers may include additives, such as sintering inhibitors and plasticizers.

A paste for external electrodes can be prepared similarly to the paste for internal electrode layers.

Green sheets and internal electrode patterns are formed using the obtained pastes and are laminated to obtain green chips.

If necessary, the green chips are subjected to a binder removal treatment. As conditions of the binder removal treatment, for example, the holding temperature is preferably 200-350° C.

After the binder removal treatment, the green chips are fired to obtain the element body 10. In the present embodiment, the atmosphere of the firing is not limited and may be the air or a reduction atmosphere. In the present embodiment, the holding temperature of the firing is not limited and is, for example, 1200-1350° C.

After the firing, if necessary, the element body 10 is subjected to a reoxidation treatment (annealing). As conditions of the annealing, the oxygen partial pressure of the annealing is preferably higher than that of the firing, and the holding temperature is preferably 1150° C. or less.

A dielectric composition constituting the dielectric layers 2 of the element body 10 obtained in the above-mentioned manner is the above-mentioned dielectric composition. The end surfaces of the element body 10 are polished, applied with the paste for external electrodes, and fired to form the external electrodes 4. Then, if necessary, a coverage layer is formed on the surfaces of the external electrodes 4 by plating or so.

Accordingly, the multilayer ceramic capacitor 1 according to the present embodiment is manufactured.

Modified Examples

In the above-mentioned embodiment, the electronic component according to the present invention is a multilayer ceramic capacitor. However, the electronic component according to the present invention is not limited to multilayer ceramic capacitors and may be any other electronic components including the above-mentioned dielectric composition.

For example, the electronic component according to the present invention may be a single-plate-type ceramic capacitor where the above-mentioned composition is provided with a pair of electrodes.

Hereinbefore, an embodiment of the present invention is explained, but the present invention is not limited to the above-mentioned embodiment and may be modified to various embodiments within the scope of the present invention.

EXAMPLES

Hereinafter, the present invention is explained in further detail with examples and comparative examples, but is not limited to the following examples.

Experiment 1

Powders of barium carbonate ($BaCO_3$), calcium carbonate ($CaCO_3$), titanium oxide ($TiO_2$), and zirconium oxide ($ZrO_2$) were prepared as starting raw materials of a main component of main phases included in a dielectric composition. The prepared starting raw materials were weighed so that the main component of the main phases after firing would be those shown in Table 1 and Table 3.

Next, the weighed powders were mixed in wet manner for 16 hours in a ball mill using ion-exchanged water as dispersion medium, and this mixture was dried to obtain a mixed raw material powder. After that, the mixed raw material powder was heated at 900° C. (holding temperature) for two hours (holding time) in the air to obtain a calcined powder of the main component of the main phases.

In addition, powders of calcium carbonate ($CaCO_3$), rare earth element oxides, and silicon oxide ($SiO_2$) were prepared as raw materials of a first additive agent. The prepared starting raw materials were weighed so that the addition amount of the first additive agent would be those shown in Table 1 and Table 3.

Incidentally, the addition amount of the first additive agent shown in Table 1 was an addition amount of the first additive agent when the main component of the main phases was 100 parts by mass.

The powders of calcium carbonate ($CaCO_3$), rare earth element oxides, and silicon oxide ($SiO_2$) were heated at 900° C. (holding temperature) for two hours (holding time) in the air to obtain a calcined powder of the first additive agent.

The calcined powder of the first additive agent was pulverized in a ball mill. The lengths of major axes and minor axes of the Ca-RE-Si—O segregation phases were adjusted by changing the pulverization time of the calcined powder of the first additive agent.

The calcined powder of the main component of the main phases and the calcined powder of the first additive agent were pulverized in wet manner for 16 hours in a ball mill using ion-exchanged water as dispersion medium, and this pulverized product was dried.

100 parts by mass of the pulverized product were added with 10 parts by mass of an aqueous solution containing 6 parts by mass of polyvinyl alcohol resin as a binder and granulated to obtain a granulated powder.

The granulated powder was put into a die (φ12 mm), temporarily pressed at 0.6 ton/cm$^2$, and permanently pressed at 1.2 ton/cm$^2$ to obtain a disc-shaped green pressed body.

The green pressed body was fired in reduction atmosphere and annealed to obtain a sintered body fired in reduction atmosphere (dielectric composition). As the firing conditions, the heating rate was 200° C./h, the holding temperature was 1250° C., and the holding time was two hours. The atmosphere gas was a mixed gas of nitrogen and hydrogen humidified to dew point 20° C. (hydrogen concentration: 3%). As the annealing conditions, the holding temperature was 1050° C., and the holding time was two hours. The atmosphere gas was a nitrogen gas humidified to dew point 20° C.

Both main surfaces of the sintered body were applied with Cu paste and fired in nitrogen atmosphere to form a pair of electrodes. Then, disc-shaped ceramic capacitor samples were obtained.

In a visual field of 10 μm×10 μm on a cross section of the dielectric composition, secondary phases were found by STEM and determined to be segregation phases.

Moreover, each amount of calcium (Ca), rare earth elements (RE), and silicon (Si) of the segregation phases was measured using EDS.

In the segregation phases, when the molar ratio of (Si/Ca) is larger than one; the molar ratio of (Si/RE) is larger than one; "(an average length of major axes of the segregation phases)/(an average particle size of the main phases)" was 1.30-2.80; and "(an average length of minor axes of the segregation phases)/(an average particle size of the main phases)" was 0.21-0.48 (measured by the following manner), these segregation phases were determined to be the Ca-RE-Si—O segregation phases.

In Sample No. 2-16 and Sample No. 21-28, the molar ratio of the first additive agent of calcium (Ca), rare earth elements (RE), and silicon (Si) and the average molar ratio of the segregation phases corresponded with each other.

"(an average length of minor axes of the segregation phases)/(an average particle size of the main phases)" and "(an average length of major axes of the segregation phases)/(an average particle size of the main phases)" were obtained in the following manner. First of all, an average particle size of the main phases in 10 square visual fields (10 μm×10 μm) was obtained. Then, an average length of minor axes and an average length of major axes of the segregation phases in the 10 square visual fields (10 μm×10 μm) were obtained. Thus, "(an average length of minor axes of the segregation phases)/(an average particle size of the main phases)" and "(an average length of major axes of the segregation phases)/(an average particle size of the main phases)" were obtained. The results are shown in Table 2 and Table 3.

The density of each of the capacitor samples was measured as below. A diameter of the disc-shaped capacitor sample after firing was obtained at three points to obtain a diameter R. Then, a thickness of the disc-shaped capacitor sample was measured at three points to obtain a thickness h. A volume V of the disc-shaped capacitor sample ($=\frac{1}{4}\cdot\pi\cdot R^2\cdot h$) was calculated using R and h. Here, $\pi$ indicates the circular constant. Next, a mass m of the disc-shaped capacitor sample was measured, and m/V was calculated to obtain a density of the disc-shaped capacitor sample. Table 2 and Table 3 show an average of the densities of three samples.

The mechanical strength of the dielectric composition was measured as below. The granulated powder was put into a die (5×53 mm), temporarily pressed at 0.6 ton/cm², and permanently pressed at 1.2 ton/cm² to obtain a green pressed body. The green pressed body was fired in the air to obtain a prismatic sintered body with a rectangular cross section. As the firing conditions, the heating rate was 200° C./h, the holding temperature was 1300° C., and the holding time was two hours.

The sintered body was processed to have an entire length of 36 mm or more and less than 45 mm, a width of 4.0±0.1 mm, and a thickness of 3.0±0.1 mm and chamfered to obtain a test specimen. 10 specimens for each sample were subjected to a three-point bending test based on the test method conformed to JIS R 1601. In the present examples, the sample whose average of the three-point bending strengths was 40 MPa or more was determined to be "A", the sample whose average of the three-point bending strengths was 30 MPa or more and less than 40 MPa was determined to be "B", the sample whose average of the three-point bending strengths was 20 MPa or more and less than 30 MPa was determined to be "C", and the sample whose average of the three-point bending strengths was less than 20 MPa was determined to be "NG". The results are shown in Table 2 and Table 3.

The Ca-RE-Si—O segregation phases included in the dielectric composition were subjected to electron beam diffraction, and an electron beam pattern was analyzed to determine the crystal system and the space group. As a result, in all of Sample No. 2-16 and 21-28, the crystal system was hexagonal, and the space group was P6₃/m.

TABLE 1

| | Main Component of Main Phase (ABO₃*1) | | | | | | | | | | |
|---|---|---|---|---|---|---|---|---|---|---|---|
| | A-site Molar Ratio of | | B-site Molar Ratio of | | | First Additive Agent *2*3 | | | | | | |
| | Each Element to Total (1 mol) of (Ba + Ca) | | Each Element to Total (1 mol) of (Ti + Zr) | | Average Particle Size | Molar Ratio of | Molar Ratio of | Molar Ratio of | Molar Ratio of Each Element to Total (1 mol) of RE | | | |
| Sample No. | Ba | Ca | Ti | Zr | [μm] | (Si/Ca) | (RE/Ca) | (Si/RE) | Y | Dy | Ho | Yb |
| 1 | 1 | 0 | 1 | 0 | 0.3 | | | | | | | |
| 2 | 1 | 0 | 1 | 0 | 0.3 | 2.67 | 2.34 | 1.14 | 0.00 | 1.00 | 0.00 | 0.00 |
| 3 | 1 | 0 | 1 | 0 | 0.3 | 3.00 | 1.33 | 2.25 | 0.00 | 1.00 | 0.00 | 0.00 |
| 4 | 1 | 0 | 1 | 0 | 0.3 | 0.25 | 1.50 | 0.17 | 1.00 | 0.00 | 0.00 | 0.00 |
| 5 | 1 | 0 | 1 | 0 | 0.3 | 0.25 | 1.50 | 0.17 | 0.00 | 1.00 | 0.00 | 0.00 |
| 6 | 1 | 0 | 1 | 0 | 0.3 | 0.25 | 1.50 | 0.17 | 0.00 | 0.00 | 1.00 | 0.00 |
| 7 | 1 | 0 | 1 | 0 | 0.3 | 1.50 | 1.50 | 1.00 | 1.00 | 0.00 | 0.00 | 0.00 |
| 8 | 0.95 | 0.05 | 1 | 0 | 0.3 | 2.65 | 2.34 | 1.13 | 0.00 | 1.00 | 0.00 | 0.00 |
| 9 | 1 | 0 | 0.8 | 0.2 | 0.3 | 2.69 | 2.30 | 1.17 | 0.00 | 1.00 | 0.00 | 0.00 |
| 10 | 0.95 | 0.05 | 0.8 | 0.2 | 0.3 | 2.70 | 2.36 | 1.14 | 0.00 | 1.00 | 0.00 | 0.00 |
| 11 | 1 | 0 | 1 | 0 | 0.3 | 2.68 | 2.35 | 1.14 | 1.00 | 0.00 | 0.00 | 0.00 |
| 12 | 1 | 0 | 1 | 0 | 0.3 | 2.70 | 2.31 | 1.17 | 0.00 | 0.00 | 1.00 | 0.00 |
| 13 | 1 | 0 | 1 | 0 | 0.3 | 2.66 | 2.38 | 1.12 | 0.00 | 0.00 | 0.00 | 1.00 |
| 14 | 1 | 0 | 1 | 0 | 0.3 | 2.64 | 2.39 | 1.11 | 0.50 | 0.50 | 0.00 | 0.00 |
| 15 | 1 | 0 | 1 | 0 | 0.3 | 4.00 | 1.33 | 3.00 | 0.00 | 1.00 | 0.00 | 0.00 |
| 16 | 1 | 0 | 1 | 0 | 0.3 | 1.72 | 1.62 | 1.06 | 0.00 | 1.00 | 0.00 | 0.00 |

*1 (Molar Ratio of A/Molar Ratio B) = 1
*2 Additive Amount of First Additive Agent: 3 parts by mass (Main Component of Main Phase: 100 parts by mass)
*3 Total of Ca, RE, and Si Included in First Additive Agent: 0.9 parts by mol or more (Total of Elements Excluding Oxygen Included in First Additive Agent: 1 part by mol)

TABLE 2

| Sample No. | Existence of Segregation Phases | (Average Length of Major Axes of Segregation Phases)/(Average Particle Size of Main Phases) | (Average Length of Minor Axes of Segregation Phases)/(Average Particle Size of Main Phases) | Existence of Ca-RE-Si—O Segregation Phases | Density [g/cm³] | Three-Poing Bending Strength |
|---|---|---|---|---|---|---|
| 1 | no | | | no | 5.62 | NG |
| 2 | yes | 1.67 | 0.33 | yes | 5.97 | A |
| 3 | yes | 1.60 | 0.44 | yes | 5.93 | A |
| 4 | yes | 1.30 | 0.22 | no | 5.64 | NG |
| 5 | yes | 1.90 | 0.30 | no | 5.65 | NG |
| 6 | yes | 2.10 | 0.40 | no | 5.62 | NG |

TABLE 2-continued

| Sample No. | Existence of Segregation Phases | (Average Length of Major Axes of Segregation Phases)/(Average Particle Size of Main Phases) | (Average Length of Minor Axes of Segregation Phases)/(Average Particle Size of Main Phases) | Existence of Ca-RE-Si—O Segregation Phases | Density [g/cm³] | Three-Poing Bending Strength |
|---|---|---|---|---|---|---|
| 7 | yes | 0.80 | 0.40 | no | 5.64 | NG |
| 8 | yes | 2.09 | 0.29 | yes | 5.92 | A |
| 9 | yes | 1.70 | 0.32 | yes | 5.97 | A |
| 10 | yes | 1.64 | 0.33 | yes | 5.91 | A |
| 11 | yes | 1.73 | 0.34 | yes | 5.99 | A |
| 12 | yes | 1.59 | 0.39 | yes | 5.94 | A |
| 13 | yes | 1.65 | 0.40 | yes | 5.98 | A |
| 14 | yes | 1.75 | 0.40 | yes | 5.95 | A |
| 15 | yes | 1.60 | 0.46 | yes | 5.93 | A |
| 16 | yes | 1.66 | 0.33 | yes | 5.97 | A |

TABLE 3

| Sample No. | Existence of Segregation Phases | (Average Length of Major Axes of Segregation Phases)/(Average Particle Size of Main Phases) | (Average Length of Minor Axes of Segregation Phases)/(Average Particle Size of Main Phases) | Existence of Ca-RE-Si—O Segregation Phases | Density [g/cm³] | Three-Poing Bending Strength |
|---|---|---|---|---|---|---|
| 21 | yes | 1.70 | 0.10 | no | 5.84 | B |
| 22 | yes | 1.62 | 0.21 | yes | 5.92 | A |
| 23 | yes | 1.71 | 0.48 | yes | 5.97 | A |
| 24 | yes | 1.63 | 0.60 | no | 5.83 | B |
| 25 | yes | 1.20 | 0.40 | no | 5.82 | B |
| 26 | yes | 1.30 | 0.33 | yes | 5.93 | A |
| 27 | yes | 2.80 | 0.37 | yes | 5.98 | A |
| 28 | yes | 3.00 | 0.38 | no | 5.87 | B |

*The composition of the main phases, the average particle size of the main phases, the composition of the first additive agent, and the amount of the first additive agent of each sample of Table 3 were the same as those of Sample No. 2.

According to Tables 1-3, compared to when there were no Ca-RE-Si—O segregation phases (Sample No. 1, 4-7, 21, 24, 25, and 28), when there were the Ca-RE-Si—O segregation phases (Sample No. 2, 3, 8-16, 22, 23, 26, and 27), the density and the strength were higher.

Experiment 2

As with Experiment 1, the samples were obtained, and the density and the three-point bending strength were obtained, except for forming a coverage layer having a component of the first additive agent in the main phases without the depositing segregation phases.

Incidentally, the coverage layer was formed in the main phases as below.

For neutralization reaction, an aqueous solution of alkali, calcium (Ca), and rare earth element (RE) was added to an aqueous solution in which the calcined powder of the main component of the main phases was dispersed. Then, the particle surface of the calcined powder of the main component was coated with calcium (Ca) and rare earth elements (RE). The calcined powder of the main component of the main phases coated with calcium (Ca) and rare earth elements (RE) was mixed with an additive component containing silicon oxide ($SiO_2$). 10 mass % of an aqueous solution containing 6 mass % of a polyvinyl alcohol resin as a binder was added to 100 mass % of the mixture for granulation to obtain a granulated powder. The subsequent steps were the same as those of Experiment 1.

TABLE 4

| Sample No. | Existence of Segregation Phases | Existence of Ca-RE-Si—O Segregation Phases | Existence of Coverage Layer | Density [g/cm³] | Three-Poing Bending Strength |
|---|---|---|---|---|---|
| 31 | no | no | yes | 5.65 | NG |

*The composition of the main phases, the average particle size of the main phases, the composition of the first additive agent, and the amount of the first additive agent of each sample of Table 4 were the same as those of Sample No. 2.

According to Tables 1-4, compared to when there were no Ca-RE-Si—O segregation phases even though there was a coverage layer (Sample No. 31), when there were the Ca-RE-Si—O segregation phases (Sample No. 2, 3, 8-16, 22, 23, 26, and 27), the density and the strength were higher.

DESCRIPTION OF THE REFERENCE NUMERICAL

1 . . . multilayer ceramic capacitor
  10 . . . element body
    2 . . . dielectric layer
      14 . . . main phase
      16 . . . Ca-RE-Si—O segregation phase
    3 . . . internal electrode layer
  4 . . . external electrode

What is claimed is:
1. A dielectric composition comprising main phases and Ca-RE-Si—O segregation phases, wherein
the main phases include a main component expressed by $ABO_3$,

"A" includes at least one selected from barium and calcium,

"B" includes at least one selected from titanium and zirconium,

"RE" represents at least one of rare earth elements, a molar ratio of (Si/Ca) is larger than one, provided that the molar ratio of (Si/Ca) is a molar ratio of silicon included in the Ca-RE-Si—O segregation phases to calcium included in the Ca-RE-Si—O segregation phases, a molar ratio of (Si/RE) is larger than one, provided that the molar ratio of (Si/RE) is a molar ratio of silicon included in the Ca-RE-Si—O segregation phases to the rare earth elements included in the Ca-RE-Si—O segregation phases, an average length of major axes of the Ca-RE-Si—O segregation phases is 1.30-2.80 times as large as an average particle size of the main phases, and an average length of minor axes of the Ca-RE-Si—O segregation phases is 0.21-0.48 times as large as an average particle size of the main phases.

2. The dielectric composition according to claim 1, wherein a molar ratio of (RE/Ca) is larger than one, provided that the molar ratio of (RE/Ca) is a molar ratio of the rare earth elements included in the Ca-RE-Si—O segregation phases to calcium included in the Ca-RE-Si—O segregation phases.

3. The dielectric composition according to claim 1, wherein "RE" is at least one selected from yttrium, dysprosium, and holmium.

4. The dielectric composition according to claim 2, wherein "RE" is at least one selected from yttrium, dysprosium, and holmium.

5. The dielectric composition according to claim 1, wherein a total of calcium, the rare earth elements, and silicon included in the Ca-RE-Si—O segregation phases is 0.9 parts by mol or more, provided that a total of elements excluding oxygen included in the Ca-RE-Si—O segregation phases is 1 part by mol.

6. The dielectric composition according to claim 2, wherein a total of calcium, the rare earth element, and silicon included in the Ca-RE-Si—O segregation phases is 0.9 parts by mol or more, provided that a total of elements excluding oxygen included in the Ca-RE-Si—O segregation phases is 1 part by mol.

7. The dielectric composition according to claim 3, wherein a total of calcium, the rare earth element, and silicon included in the Ca-RE-Si—O segregation phases is 0.9 parts by mol or more, provided that a total of elements excluding oxygen included in the Ca-RE-Si—O segregation phases is 1 part by mol.

8. The dielectric composition according to claim 4, wherein a total of calcium, the rare earth element, and silicon included in the Ca-RE-Si—O segregation phases is 0.9 parts by mol or more, provided that a total of elements excluding oxygen included in the Ca-RE-Si—O segregation phases is 1 part by mol.

9. The dielectric composition according to claim 1, wherein the Ca-RE-Si—O segregation phases have a hexagonal crystal system.

10. The dielectric composition according to claim 2, wherein the Ca-RE-Si—O segregation phases have a hexagonal crystal system.

11. The dielectric composition according to claim 3, wherein the Ca-RE-Si—O segregation phases have a hexagonal crystal system.

12. The dielectric composition according to claim 5, wherein the Ca-RE-Si—O segregation phases have a hexagonal crystal system.

13. The dielectric composition according to claim 1, wherein a space group of the Ca-RE-Si—O segregation phase is as follows:

$P6_3/m$.

14. The dielectric composition according to claim 2, wherein a space group of the Ca-RE-Si—O segregation phase is as follows:

$P6_3/m$.

15. The dielectric composition according to claim 3, wherein a space group of the Ca-RE-Si—O segregation phase is as follows:

$P6_3/m$.

16. The dielectric composition according to claim 5, wherein a space group of the Ca-RE-Si—O segregation phase is as follows:

$P6_3/m$.

17. The dielectric composition according to claim 9, wherein a space group of the Ca-RE-Si—O segregation phase is as follows:

$P6_3/m$.

18. An electronic component comprising the dielectric composition according to claim 1.

* * * * *